(12) United States Patent
Tsirkin

(10) Patent No.: US 12,164,450 B2
(45) Date of Patent: *Dec. 10, 2024

(54) MANAGING NETWORK INTERFACE CONTROLLER-GENERATED INTERRUPTS

(71) Applicant: Red Hat Israel, Ltd., Raanana (IL)

(72) Inventor: Michael Tsirkin, Lexington, MA (US)

(73) Assignee: Red Hat Israel, Ltd., Raanana (IL)

( * ) Notice: Subject to any disclaimer, the term of this patent is extended or adjusted under 35 U.S.C. 154(b) by 337 days.

This patent is subject to a terminal disclaimer.

(21) Appl. No.: 17/368,172

(22) Filed: Jul. 6, 2021

(65) Prior Publication Data
US 2021/0334228 A1 Oct. 28, 2021

Related U.S. Application Data

(63) Continuation of application No. 14/034,866, filed on Sep. 24, 2013, now Pat. No. 11,061,840.

(51) Int. Cl.
G06F 13/24 (2006.01)

(52) U.S. Cl.
CPC .................. G06F 13/24 (2013.01)

(58) Field of Classification Search
CPC .................. G06F 13/24; G06F 12/02
See application file for complete search history.

(56) References Cited

U.S. PATENT DOCUMENTS

| | | |
|---|---|---|
| 5,875,343 A | 2/1999 | Binford et al. |
| 5,943,479 A | 8/1999 | Klein et al. |
| 6,256,660 B1 | 7/2001 | Govindaraju et al. |
| 6,549,977 B1 | 4/2003 | Horst |
| 6,985,986 B2 | 1/2006 | Boles |
| 7,012,926 B2 | 3/2006 | Weng |
| 7,562,366 B2 | 7/2009 | Pope |
| 8,122,125 B2 | 2/2012 | Monchiero |
| 2006/0064520 A1* | 3/2006 | Anand .................. G06F 13/24 710/52 |
| 2006/0174251 A1* | 8/2006 | Pope .................. H04L 49/9047 719/318 |
| 2009/0228665 A1 | 9/2009 | Van Riel et al. |
| 2009/0319733 A1* | 12/2009 | Ma .................. G06F 13/24 711/159 |
| 2010/0169528 A1 | 7/2010 | Kumar |
| 2010/0205395 A1* | 8/2010 | Srinivasan .......... G06F 9/45558 718/1 |

(Continued)

OTHER PUBLICATIONS

USPTO, Office Action for U.S. Appl. No. 14/034,866, mailed Mar. 23, 2016.

(Continued)

Primary Examiner — Phong H Dang
(74) Attorney, Agent, or Firm — Dority & Manning, P.A.

(57) ABSTRACT

Systems and methods for managing interrupts generated by network interface controllers. An example method may comprise: responsive to determining that a memory pressure metric in a computer system does not exceed a threshold value, disabling interrupts that signal completion of a packet transmission by a network interface controller; transmitting a plurality of data packets by the network interface controller; and responsive to detecting that the memory pressure metric exceeds the threshold value, releasing a memory buffer allocated to a data packet of the plurality of data packets.

8 Claims, 4 Drawing Sheets

(56) References Cited

U.S. PATENT DOCUMENTS

2011/0179413 A1     7/2011   Subramanian et al.
2012/0254492 A1   10/2012   Li et al.
2013/0227241 A1*   8/2013   Shimizu ................ G06F 12/023
                                                                                   711/171

OTHER PUBLICATIONS

USPTO, Final Office Action for U.S. Appl. No. 14/034,866, mailed Jul. 5, 2016.
USPTO, Office Action for U.S. Appl. No. 14/034,866, mailed Feb. 21, 2017.
USPTO, Final Office Action for U.S. Appl. No. 14/034,866, mailed Aug. 30, 2017.
USPTO, Office Action for U.S. Appl. No. 14/034,866, mailed Apr. 2, 2018.
USPTO, Final Office Action for U.S. Appl. No. 14/034,866, mailed Aug. 23, 2018.
USPTO, Advisory Action for U.S. Appl. No. 14/034,866, mailed Sep. 14, 2016.
USPTO, Advisory Action for U.S. Appl. No. 14/034,866, mailed Nov. 16, 2017.
USPTO, Advisory Action for U.S. Appl. No. 14/034,866, mailed Nov. 6, 2018.
USPTO, Notice of Allowance for U.S. Appl. No. 14/034,866, mailed Mar. 10, 2021.
Se Polge et al.; "Reducing CPU Utilization by Controlling Transmit Complete Interrupts"; IBM Technical Disclosure Bulletin, vol. 38, No. 07, Jul. 1995, 3 pages.

* cited by examiner

MANAGING NETWORK INTERFACE CONTROLLER-GENERATED INTERRUPTS

RELATED APPLICATIONS

This application is a continuation of U.S. patent application Ser. No. 14/034,866 filed on Sep. 24, 2013, the entire content of which is incorporated by reference herein.

TECHNICAL FIELD

The present disclosure is generally related to computer systems, and is more specifically related to systems and methods for managing interrupts generated by network interface controllers.

BACKGROUND

Network interface controllers (NIC) implement the OSI layer 1 (physical layer) and OSI layer 2 (data link layer standards), thus providing physical access to a networking medium and a low-level addressing system using media access control (MAC) addresses, in order to allow computer systems to communicate over a wired or wireless network.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
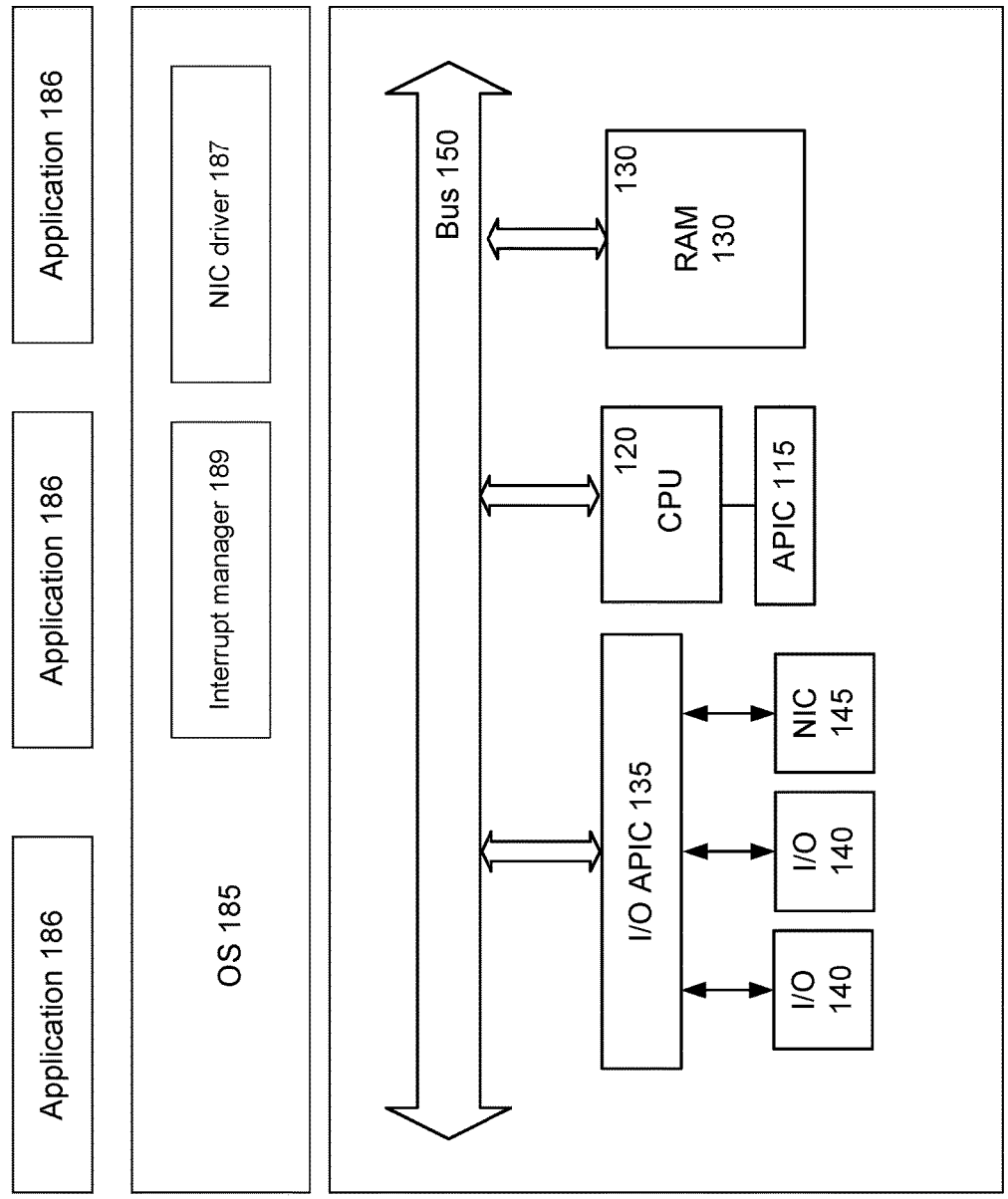
FIG. 1 depicts a high-level component diagram of an example computer system, in accordance with one or more aspects of the present disclosure.

Described herein are methods and systems for managing interrupts generated by network interface controllers (NIC). A computer system may be equipped with one or more NICs providing physical access to a networking medium and a low level addressing system (e.g., using media access control (MAC) addresses), in order to allow the computer system to communicate over a wired or wireless network.

For transmission of a data packet, the operating system may put the data packet identifier into a transmit queue. Responsive to receiving a ready-to-transmit signal asserted by a NIC, the NIC driver may retrieve a packet identifier from the queue, read the packet from the memory buffer and transmit the packet over the network. Responsive to completing the packet transmission, the NIC may update the transmit queue indicating that the packets have been transmitted, and the operating system may release the memory buffer that has previously been allocated for storing the data packet.

In certain implementations, the above described signaling may be implemented by the NIC via hardware and/or software interrupts. "Interrupt" herein shall refer to an event that requires a processor to execute event-specific instructions, which might involve the processor's holding the current thread of execution and/or switching contexts.

In conventional systems, the NIC may assert an interrupt responsive to completing the packet transmission, so that the operating system would release a memory buffer that has previously been allocated for storing the outgoing data packet. However, the interrupt processing adds processing overhead, at least in the form of consumed CPU cycles, to each packet being transmitted. The overhead can be reduced by reducing the interrupt frequency, e.g., by generating a single interrupt for multiple transmitted packets. However, this approach would only be efficient if the number of packets that are being transmitted in a unit of time exceeds a certain threshold. An alternative overhead reducing approach may involve using an unrelated event, e.g., a receive interrupt or a ready-to-transmit notification (such as a ready-to-transmit interrupt), for triggering the memory buffer release. However, this approach entails unpredictable latency and thus may lead to memory pressure conditions arising within the computer system. Another alternative approach involves using a timer for triggering the memory buffer release. However, processing timer interrupts would also consume CPU cycles and additional memory buffers, thus providing no overhead reduction as compared to employing NIC-generated interrupts.

Aspects of the present disclosure address the above noted deficiencies by disabling the NIC-generated interrupts signaling the completion of packet transmission, and releasing the transmit buffers responsive to detecting a memory pressure condition in the computer system. Various aspects of the above referenced methods and systems are described in details herein below by way of examples, rather than by way of limitation.

FIG. 1 depicts a high-level component diagram of an illustrative example of a computer system 100 in accordance with one or more aspects of the present disclosure. Computer system 100 may include one or more physical processors 120 communicatively coupled to memory devices 130 and input/output (I/O) devices 140 via a system bus 150.

"Physical processor" or "processor" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data. In an illustrative example, an I/O device may be provided by a network interface controller (NIC) 145. Computer system 100 may comprise a NIC driver 187 facilitating communications of operating system 185 with one or more NICs 145.

Computer system 100 may further comprise one or more Advanced Programmable Interrupt Controllers (APIC), including one local APIC 115 per processor and one or more I/O APICs 135. Local APIC 115 may receive interrupts from local sources (including timer interrupts, internal error interrupts, performance monitoring counter interrupts, thermal sensor interrupts, and I/O devices connected to the processor's local interrupt pins either directly or via an external interrupt controller) and externally connected I/O devices (i.e., UO devices connected to an I/O APIC), as well as inter-processor interrupts (IPIs). The latter may be used for software self-interrupts, interrupt forwarding or preemptive scheduling. Local APIC 115 may handle interrupts from externally connected I/O devices by the IPI message handling mechanism.

In the illustrative example of FIG. 1, computer system 100 may execute an operating system 185 and one or more applications 186. Alternatively, computer system 100 may run one or more virtual machines (not shown in FIG. 1), by executing a software layer, often referred to as "hypervisor," above the hardware and below the virtual machines. The hypervisor may abstract the physical layer, including processors, memory, and I/O devices, and present this abstraction to the virtual machines as virtual devices. A virtual machine may execute a guest operating system and one or more applications. Interrupts may be virtualized by the hypervisor identifying one or more virtual processors for servicing an outstanding interrupt, and "injecting the interrupt" by routing it to the identified virtual processors. Injectable interrupts may include external interrupts, non-maskable interrupt (NMI), processor exceptions, software-generated interrupts, and/or software traps.

In accordance with one or more aspects of the present disclosure, computer system 100 may run an interrupt manager component 189 programmed to selectively disable NIC-generated interrupts as described in more details herein below. In certain implementations, interrupt manager component 189 may be packaged as a component of operating system 185 executed in the kernel space, the user space, or both. Alternatively, interrupt manager component 189 may be packaged as a user space application running under operating system 185.

Responsive to ascertaining that there a memory pressure metric in computer system 100 does not exceed a pre-defined or dynamically configurable threshold value, interrupt manager component 189 may disable NIC-generated interrupts signaling the completion of packet transmission. In an illustrative example, disabling transmission complete interrupts may be performed by writing a pre-defined value into a configuration register of NIC 145. Alternatively, disabling transmission complete interrupts may be performed by writing a pre-defined value into a configuration register of local APIC 115 and/or I/O APIC 135.

Figure 2:
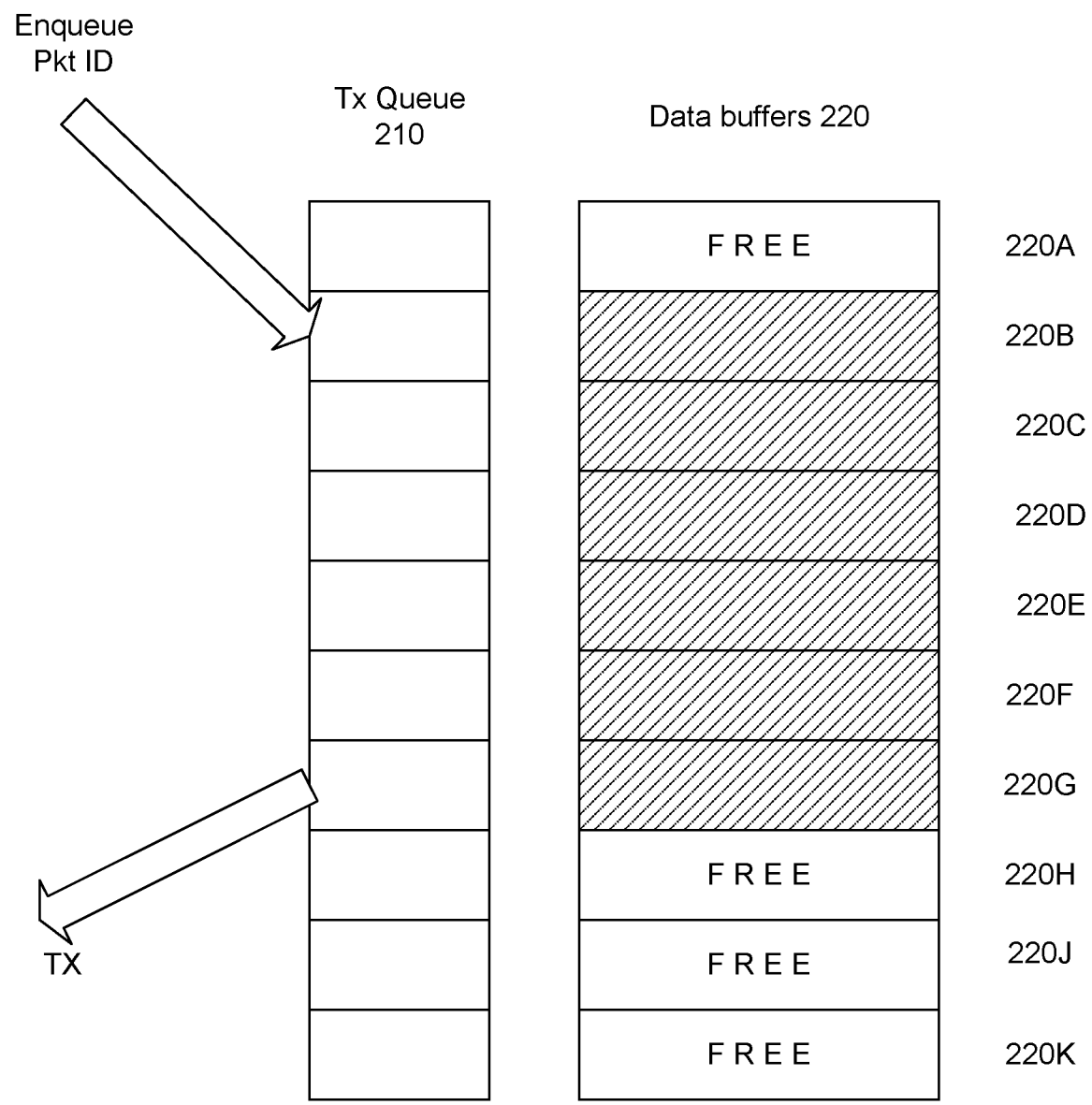
FIG. 2 schematically illustrates interrupt handling network packet transmission, in accordance with one or more aspects of the present disclosure.

As schematically illustrated by FIG. 2, operating system 185 may put an identifier of a data packet to be transmitted over the network into a transmit queue 210. Responsive to receiving a ready-to-transmit notification from NIC 140, NIC driver 187 may retrieve the packet identifier from queue 210, read the packet from the memory buffer 220 and transmit the packet over the network. In an illustrative example, the packet identifier may comprise the address of memory buffer 220. In certain implementations, the packet identified may further comprise the size of memory buffer 220.

Asynchronously with respect to transmitting data packets, operating system 185 may determine that the memory pressure metric in computer system 100 exceeds the threshold value, and responsive to ascertaining that NIC 145 has transmitted one or more packets over the network, release one or more memory buffers 220B-220G that have previously been allocated for storing the transmitted data packets. In an illustrative example, NIC driver 187 may query the status of transmitted packets in transmit queue 210.

In certain implementations, responsive to detecting that the memory pressure metric in computer system 100 exceeds the threshold value, operating system 185 may enable transmission complete interrupts generated by NIC 145. In an illustrative example, enabling transmission complete interrupts may be performed by writing a pre-defined value into a configuration register of NIC 145. Alternatively, enabling transmission complete interrupts may be performed by writing a pre-defined value into a configuration register of local APIC 115 and/or I/O APIC 135.

The memory pressure in a computer system may be measured by one or more metrics. In an illustrative example, the memory pressure metric may comprise the total size of memory buffers allocated to the transmitted data packets. In another illustrative example, the memory pressure metric may comprise the difference between a pre-defined value and the amount of available physical memory. In another illustrative example, the memory pressure metric may comprise the number of memory page faults within a unit of time. In another illustrative example, the memory pressure metric may comprise a period of time during which an application being executed by the computer system has been blocked by a memory allocation operation.

In certain implementations, one or more actions directed to detecting the memory pressure, including comparing the amount of available physical memory to the low memory threshold and/or comparing the page fault count to the page fault threshold, may be performed periodically, at a pre-defined frequency (e.g., responsive to a timer event). Alternatively, the memory pressure condition may be ascertained responsive to transmitting a pre-defined number of data packets by the NIC.

Figure 3:
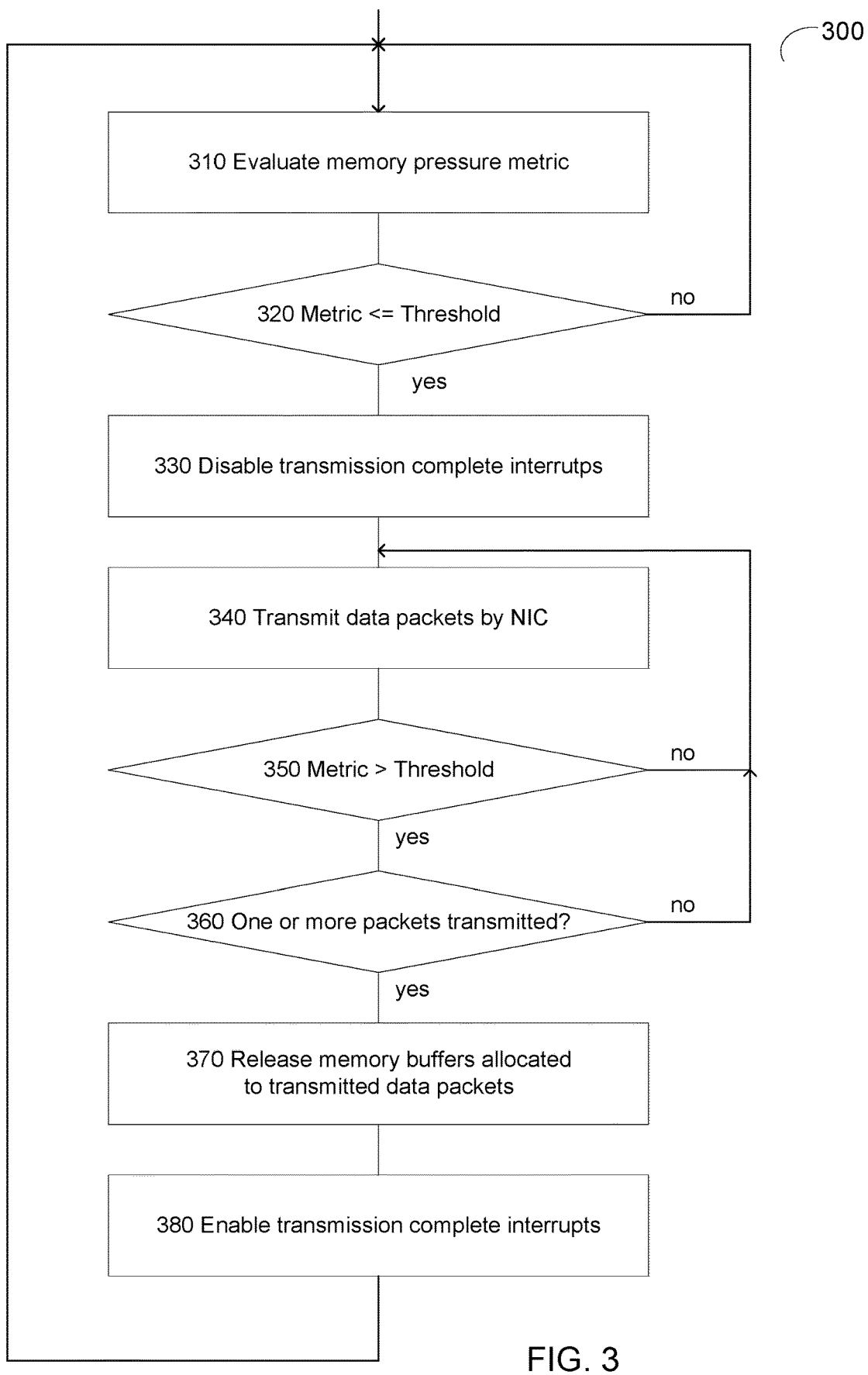
FIG. 3 depicts a flow diagram of a method for managing interrupts generated by network interface controllers, in accordance with one or more aspects of the present disclosure.

FIG. 3 depicts a flow diagram of an example method 300 for managing NIC-generated interrupts. Method 300 may be performed by a computer system that may comprise hardware (e.g., circuitry, dedicated logic, and/or programmable logic), software (e.g., instructions executable on a computer system to perform hardware simulation), or a combination thereof. Method 300 and/or each of its individual functions, routines, subroutines, or operations may be performed by one or more physical processors of the computer system executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, a computer system may evaluate a memory pressure metric in a computer system, as described in more details herein above. In an illustrative example, the memory pressure metric may comprise the total size of memory buffers allocated to the data packets transmitted by a NIC. In another illustrative example, the memory pressure metric may comprise the difference between a pre-defined value and the amount of available physical memory. In another illustrative example, the memory pressure metric may comprise the number of memory page faults within a unit of time. In another illustrative example, the memory pressure metric may comprise a period of time during which an application being executed by the computer system has been blocked by a memory allocation operation.

Responsive to determining, at block 320, that the memory pressure metric does not exceed a pre-defined or dynamically configurable threshold value, the computer system may, at block 330, disable interrupts that signal completion of a packet transmission by a NIC. In an illustrative example, disabling transmission complete interrupts may be performed by writing a pre-defined value into a configuration register of the NIC. Alternatively, disabling transmission complete interrupts may be performed by writing a pre-defined value into a configuration register of a local APIC and/or I/O APIC, as described in more details herein above.

At block 340, the computer system may transmit a plurality of data packets by the NIC. In certain implementations, the NIC driver may transmit one or more data packets responsive to receiving a ready-to-transmit notification (e.g., a ready-to-transmit interrupt) asserted by the NIC, as described in more details herein above.

Responsive to determining, at blocks 350-360, that the memory pressure metric in the computer system exceeds the threshold value, and that one or more packets have been transmitted by the NIC, the computer system may, at block 370, release the memory buffers allocated to one or more transmitted data packets.

In certain implementations, the computer system may, at block 380, enable transmission complete interrupts generated by the NIC. Upon completing the operations referenced by block 380, the method may loop back to step 310.

In certain implementations, responsive to determining that the memory pressure metric in the computer system still exceeds the threshold value after releasing the memory buffers allocated to one or more transmitted data packets, the computer system may enable transmission complete interrupts by the NIC. Alternatively, the computer system may enable transmission complete interrupts responsive to determining that the total size of data packets submitted, within a unit of time, by the operating system to the NIC for transmission exceeds a pre-defined or dynamically configurable threshold size.

Figure 4:
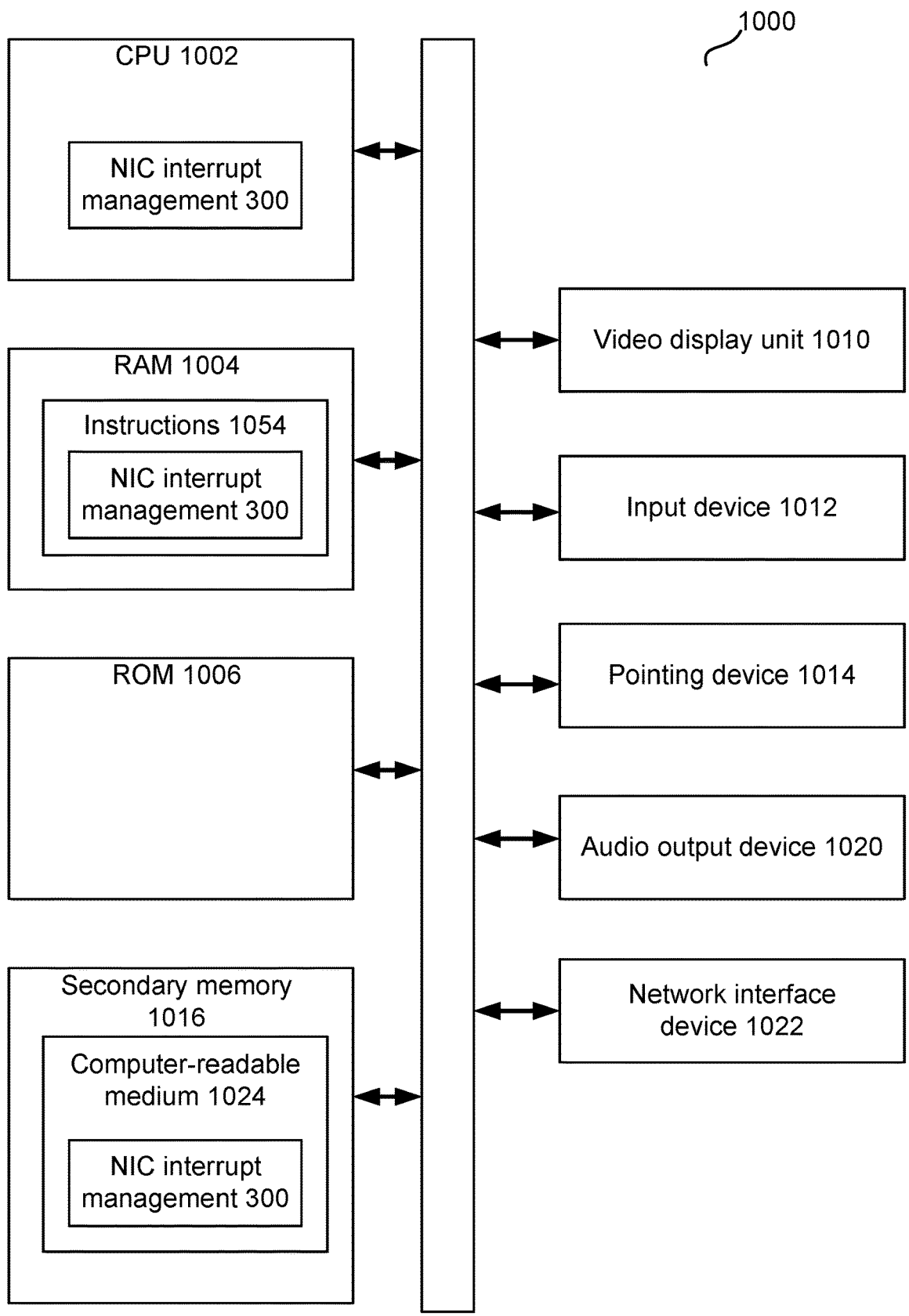
FIG. 4 depicts a block diagram of an illustrative computer system operating in accordance with examples of the invention.

FIG. 4 depicts an example computer system 1000 which can perform any one or more of the methods described herein. In one example, computer system 1000 may correspond to host computer system 100 of FIG. 1.

In one example, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a physical processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

Processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface controller 1022. Computer system 1000 also may include a video display unit 1010 (e.g., an LCD), an alphanumeric input device 1012 (e.g., a keyboard), a pointing device 1014 (e.g., a mouse), and an audio output device 1020 (e.g., a speaker).

Secondary memory 1016 may include a non-transitory computer-readable storage medium 1024 on which may be stored instructions 1054 encoding any one or more of the methods or functions described herein, including instructions encoding interrupt manager component 189 of FIG. 1 implementing method 300 for NIC-generated interrupt management.

Instructions 1054 may also reside, completely or partially, within main memory 1004 and/or within processor 1002 during execution thereof by computer system 1000, hence, main memory 1004 and processor 1002 may also constitute machine-readable storage media.

While computer-readable storage medium 1024 is shown as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any non-transitory medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices.

Examples described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the methods and/or each of their individual functions, routines, subroutines, or operations. The required structure for a variety of these systems will appear as set forth in the description above.

The above description is intended to be illustrative, and not restrictive. Although the present disclosure has been described with references to specific illustrative examples and embodiments, it will be recognized that the present disclosure is not limited to the examples and embodiments described. The scope of the disclosure should be determined with reference to the following claims, along with the full scope of equivalents to which the claims are entitled.

The invention claimed is:

1. A method, comprising:
responsive to determining, by a computer system, that a memory pressure metric in the computer system does not exceed a threshold value, disabling interrupts that signal completion of a packet transmission by a network interface controller, wherein the memory pressure metric comprises a period of time during which an application being executed by the computer system has been blocked by a memory allocation operation;
transmitting a plurality of data packets by the network interface controller; and
responsive to detecting that the memory pressure metric exceeds the threshold value, releasing a memory buffer allocated to a data packet of the plurality of data packets.

2. The method of claim 1, further comprising determining that one or more data packets have been transmitted by the network interface controller, responsive to detecting that the memory pressure metric exceeds the threshold value.

3. The method of claim 1, further comprising:
responsive to detecting that the memory pressure metric exceeds the threshold value, enabling interrupts that signal completion of packet transmission by the network interface controller.

4. A system comprising:
a memory; and
one or more processors, coupled to the memory, to:
responsive to determining that a memory pressure metric in the system does not exceed a threshold value, disable interrupts that signal completion of a packet transmission by a network interface controller, wherein the memory pressure metric comprises a period of time during which an application being executed by the computer system has been blocked by a memory allocation operation;
transmit a plurality of data packets by the network interface controller; and
responsive to detecting that the memory pressure metric exceeds the threshold value, release a memory buffer allocated to a data packet of the plurality of data packets.

5. The system of claim 4, wherein the processors are further to:
responsive to detecting that the memory pressure metric exceeds the threshold value, enable interrupts that signal completion of packet transmission by the network interface controller.

6. The system of claim 4, wherein disabling interrupts is performed by writing a pre-defined value into one of: a network interface controller or an interrupt controller.

7. A computer-readable non-transitory storage medium comprising executable instructions that, when executed by a computer system, cause the computer system to:
responsive to determining, by a computer system, that a memory pressure metric in the computer system does not exceed a threshold value, disable interrupts that signal completion of a packet transmission by a network interface controller, wherein the memory pressure metric comprises a period of time during which an application being executed by the computer system has been blocked by a memory allocation operation;
transmit a plurality of data packets by the network interface controller; and
responsive to detecting that the memory pressure metric exceeds the threshold value, release a memory buffer allocated to a data packet of the plurality of data packets.

8. The computer-readable non-transitory storage medium of claim 7, further comprising instructions that, when executed by a computer system, cause the computer system to:
responsive to detecting that the memory pressure metric exceeds the threshold value, enabling interrupts that signal completion of packet transmission by the network interface controller.

* * * * *